(12) United States Patent
Clute et al.

(10) Patent No.: US 8,459,584 B2
(45) Date of Patent: Jun. 11, 2013

(54) BELT TENSIONER FOR A BELT RETRACTOR

(75) Inventors: Günter Clute, Elmshorn (DE); Juri Kraus, Hamburg (DE); Kazuhiro Moro, Elmshorn (DE)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 13/265,360

(22) PCT Filed: Apr. 15, 2010

(86) PCT No.: PCT/EP2010/002305
§ 371 (c)(1),
(2), (4) Date: Oct. 20, 2011

(87) PCT Pub. No.: WO2010/121746
PCT Pub. Date: Oct. 28, 2010

(65) Prior Publication Data
US 2012/0037744 A1 Feb. 16, 2012

(30) Foreign Application Priority Data
Apr. 23, 2009 (DE) .......................... 10 2009 018 331

(51) Int. Cl.
*B65H 75/48* (2006.01)
(52) U.S. Cl.
USPC .......................................................... 242/374
(58) Field of Classification Search
USPC .................... 242/374, 390; 60/632; 280/806, 280/807
See application file for complete search history.

(56) References Cited

U.S. PATENT DOCUMENTS

| 7,735,871 B2 * | 6/2010 | Schmidt et al. ............... 280/807 |
| 2007/0272786 A1 * | 11/2007 | Schmidt et al. ............... 242/374 |

FOREIGN PATENT DOCUMENTS

| DE | 195 12 660 A1 | 10/1995 |
| DE | 196 02 549 A1 | 8/1996 |
| DE | 696 03 158 T2 | 3/2000 |
| DE | 103 56 206 A1 | 7/2005 |
| DE | 20 2005 017 941 U1 | 2/2006 |
| DE | 10 2008 008 041 A1 | 7/2008 |
| WO | WO 97/43149 | 11/1997 |
| WO | WO 2005/054016 A1 | 6/2005 |
| WO | WO 2010/121746 A1 | 10/2010 |

OTHER PUBLICATIONS

PCT International Search Report—Jun. 4, 2010.
Search Report—Dec. 22, 2009.

* cited by examiner

*Primary Examiner* — Michael Mansen
*Assistant Examiner* — Juan Campos, Jr.
(74) *Attorney, Agent, or Firm* — Brinks Hofer Gilson & Lione

(57) ABSTRACT

Described is a belt tensioner for a seat belt having a belt retractor, a tensioner pinion (4) non-rotatably connected to the belt retractor, a tube (2) having a pyrotechnical gas generator arranged therein, and a plurality of mass bodies (6) driven by the pressure generated by the gas generator. The mass bodies (6) engage with the tensioner pinion (4) in a force transmitting manner and drive the belt retractor in the winding direction. A first and a second section (2a, 2b) of the tube (2) run parallel to each other. A third section (2c) with a curved course that projects out of the plane (E) connects the first and second sections, thereby creating a space (7) between the first, second and third sections (2a, 2b, 2c), for accommodating at least one of the mass bodies (6a, 6b).

10 Claims, 2 Drawing Sheets

BELT TENSIONER FOR A BELT RETRACTOR

CROSS REFERENCE TO RELATED APPLICATIONS

This application claims priority to German Patent Application No. 10 2009 018 331.0, filed Apr. 23, 2009 and PCT/EP2010/002305, filed Apr. 15, 2010.

TECHNICAL FIELD OF THE INVENTION

The invention relates to a belt tensioner for a belt retractor.

BACKGROUND OF THE INVENTION

From DE 196 02 549 A1 is known, for example, a belt tensioner for a safety belt having a belt retractor, a tensioner pinion that can be or is non-rotatably connected to the belt retractor, a tube having a pyrotechnical gas generator arranged therein, and a plurality of mass bodies that can be driven by the pressure generated by the gas generator. The mass bodies can be engaged in the tensioner pinion in a force transmitting manner and drive the belt retractor in winding direction when the belt tensioner is activated. A first section of the tube runs alongside the tensioner pinion in perpendicular direction with respect to the longitudinal axis of the belt spool, and a second section, which is opposite to the first section, is directed tangentially toward the tensioner pinion. The first section and the second section are arranged in a plane and are connected to each other by way of a third section, which is likewise located in the plane. The basic problem presented by this kind of displacement of the tube is that the mass bodies that emerge from the tensioner pinion have to be led away, so that the driving motion of the mass bodies is not disrupted by an accumulation of the mass bodies.

From DE 195 12 660 A1 is known a belt tensioner with an identical tube guide, in which a collection container is provided to accommodate the mass bodies after they emerge from the tensioner pinion. It is disadvantageous of this approach, however, that the number of mass bodies is limited due to the tube guide and the size of the collection container when mass bodies of a particular size are used.

Since the tightening length of such a belt tensioner that is to be attained is directly dependent from the number of the mass bodies, the tightening length to be attained with such a belt tensioner is thus also automatically limited.

SUMMARY OF THE INVENTION

With this as background, it is an object of the invention to create a belt tensioner of the described kind with an increased tightening length.

The invention proposes to provide the third section of the tube with a curved course that projects out of the plane and to create a free space between the first, second and third sections, in which at least one of the mass bodies can be accommodated after they emerge out of the tensioner pinion. Two advantages are simultaneously achieved as a result of the proposed guide of the tube; a free space is created, on the one hand, to accommodate the mass bodies after they emerge from the tensioner pinion, and the tube length is increased, on the other hand, so that more mass bodies can be stored in the tube and the possible tightening length is increased. An accumulation of mass bodies after they emerge from the tensioner pinion is prevented therein as a result of the created free space, despite the greater number of mass bodies.

It is furthermore proposed to guide the mass bodies at least in some sections parallel to the tube after they emerge from the tensioner pinion. The available installation space can be optimally utilized as a result of the parallel guiding of the mass bodies, so that a very compact shape of the belt tensioner can be realized. The mass bodies can also be guided—to the extent that this is necessary—by positioning them against the tube.

A particularly compact design of the belt tensioner can be attained in that the path of motion of the mass bodies predetermined by the tube and the tensioner pinion has a spiral shape.

It is also proposed to provide a guide path running parallel to the third section for accommodating the mass bodies, so that the mass bodies are guided in optimized manner with respect to the installation space after they emerge from the tensioner pinion.

The third section should preferably be curved in direction toward the belt spool, so that the outside dimensions of the belt tensioner are not increased. Since the available installation space in motor vehicles is inherently limited, the outside dimensions are an important feature in the purchase decision, which should be taken into account by the motor vehicle manufacturer.

It is furthermore proposed that the third section is curved in a U-shape out of the plane and that the free space created by the curvature in an extension perpendicular to the plane has a dimension A of at least the thickness of the mass bodies. As a result of the proposed design of the created free space, it is possible to accommodate at least one mass body in its entirely within the free space.

It is further proposed to provide the tube with a gas generator receptacle and to position the gas generator receptacle and the first section and the second section within one plane. Insofar as the sections have the same diameter, this would mean that at least one side of the sections and of the gas generator receptacle are located within one plane. Insofar as the gas generator receptacle and the sections have different diameters or outside dimensions, this can also be achieved in that the particular middle axes are located within one plane. The design of the belt tensioner can in any case be additionally simplified thereby, so that the assembly of the belt tensioner is overall simplified.

It is additionally proposed to provide the tube with a gas generator receptacle and to align the gas generator receptacle and the second section in parallel. Contaminant particles present in the gas generator receptacle and in the second section can eventually drop out as a result of the proposed alignment when the gas generator is mounted from below.

It is further proposed to provide the tube with a gas generator receptacle and to form the gas generator receptacle by means of a linear extension of the first section. The tube profile can be further simplified by omitting a curvature of the tube as a result of the proposed alignment of the gas generator receptacle. The third section becomes longer in addition if the overall tube length of the third section remains unchanged, so that the free space created by the proposed profile of the third section is enlarged.

It is further proposed to guide the mass bodies in a single file after they emerge from the tensioner pinion and to provide on the belt tensioner, against which the first mass strikes, while at least one mass body is still present in the tensioner pinion. The impact of the first mass body generates a pulse in the single file of mass bodies, which is transferred to the tensioner pinion by the mass bodies still present in the tensioner pinion. This pulse can be utilized to undo a still existing connection between the tensioner pinion and the belt spool, so that a subsequent rotation of the belt spool in the belt extension direction during a force-limited belt extension cannot be disrupted. An uninterrupted mass body single file is further created as a result of the stop, which blocks the tensioner pinion with respect to the belt tensioner housing. This prevents the tensioner pinion from continuing to rotate in an uncontrolled manner and thus possibly disrupting the desired force limiting characteristic. A condition, which represents a reliable basis for the design for all subsequent motion sequences in the belt tensioner, is created in any case as a result of the locked tensioner pinion.

The invention will be explained in greater detail below based on one preferred exemplary embodiment.

DETAILED DESCRIPTION OF THE DRAWINGS

Figure 1:
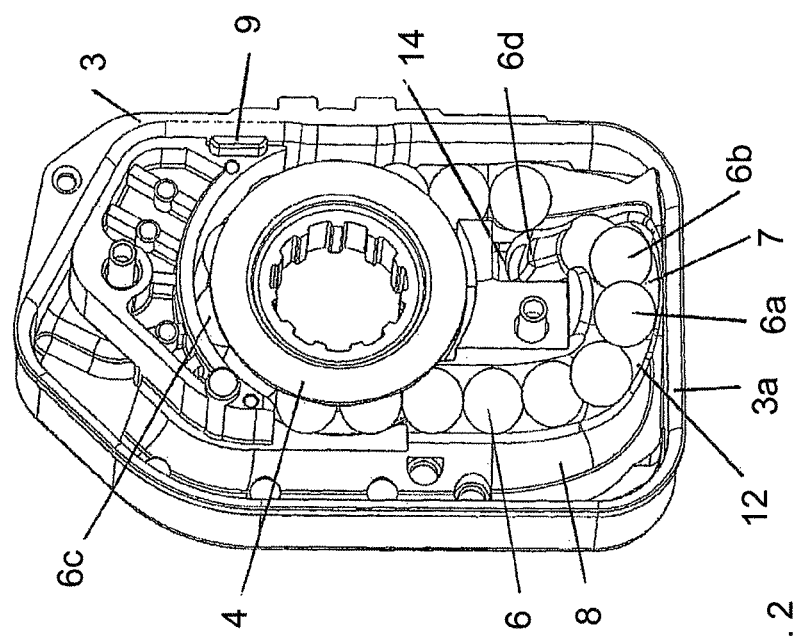
FIG. 1: shows a housing having a tensioner pinion, a tube arranged in said housing, and several mass bodies emerging from the tensioner pinion.

FIG. 1 shows a housing 3 having a tensioner pinion 4 rotatably arranged therein and a tube 2. The overall unit is pre-assembled and pushed from the side with the opening 13 onto a attachment piece of a belt spool (not illustrated). The attachment piece onto which the tensioner pinion 4 is pushed can be a part of the belt spool itself or, in the case of a belt spool with a force limiting device, can also be part of the locking mechanism. Gear teeth 5 are provided in the opening 13 so that the tensioner pinion 4 can be torque-proof connected to the belt spool in a direct or indirect manner.

The tube 2 can be divided into several sections. Beginning at a gas generator receptacle 11 bent in the direction of the belt spool, the tube 2 first has a first section 2a that has an axis arranged perpendicularly with respect to a longitudinal axis X of the belt spool that is also the axis of rotation of the tensioner pinion 4 arranged coaxially with respect to the belt spool. From the section 2a, the tube 2 passes into a third section 2c which has a curved axis in the direction of the belt spool and connects the first section 2a to a second section 2b with an axis running parallel to the axis of the first section 2a. The second section 2b and the first section 2a are located on opposite sides of the drive wheel, and its axis is tangentially directed toward the tensioner pinion 4. A free space 7 is created between the first section 2a, the second section 2b, and the third section 2c as a result of the described tube profile.

Figure 2:
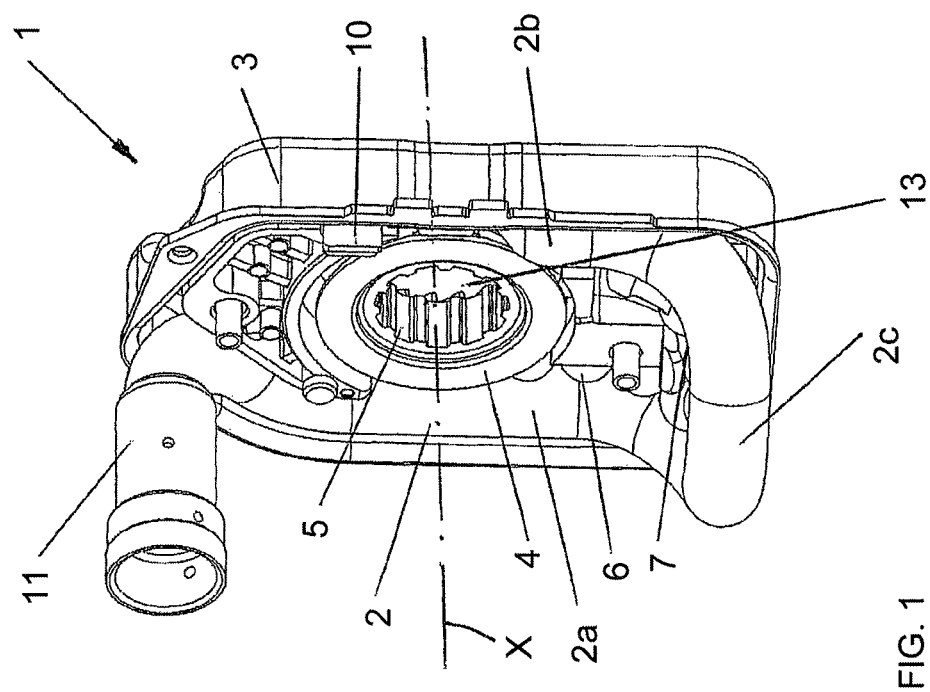
FIG. 2: shows a housing having a tensioner pinion without tube, with mass bodies emerging from the tensioner pinion.

A single file of several mass bodies 6 can further be seen, of which at least several have emerged from the tensioner pinion 4. The illustrated arrangement of the mass bodies 6 corresponds to the arrangement after the tightening of the safety belt has taken place. FIG. 2 shows the same unit, but without the tube 2 of FIG. 1. The free space 7 is exposed as a result of the absent tube 2 and it can be seen that at least two mass bodies 6a and 6b are at least partially accommodated in the free space 7. The mass bodies 6 are guided in a guide path 12 parallel to the sections 2a and 2c along the inside of the tube 2 (see FIG. 1), so that a spiral-shaped course of the guide of the mass bodies 6 is obtained starting from the gas generator receptacle 11 up to the last mass body 6d. The unit formed by the housing 3, the tensioner pinion 4, the tube 2, and the mass bodies 6 can be provided with a very compact design and the greatest number of mass bodies can be utilized as a result of the spiral-shaped course. Both the tube 2 and also the guide path 12 are configured longer and more mass bodies 6 can be provided than is the case in the approach known from the prior art as a result of the curved profile of the tube 2 and also the guide path 12 created according to the invention. The tightening length that can be attained can then also be increased as a result of the greater number of mass bodies 6.

A few mass bodies 6c are still located in the tensioner pinion 4 even after the tightening movement has been completed, which is particularly practical when the belt tensioner is intended to contribute to the force limiting after completion of the tightening movement during a subsequent forward displacement of the passengers.

A stop 14, against which the first mass body 6d of the mass bodies 6 guided in a single file strikes, is provided on the housing 3, so that the tightening movement is stopped in an abrupt manner. A pulse is generated in a direction opposite to the tightening movement, which is transferred to the tensioner pinion 4 across the single file of mass bodies 6 and the mass bodies 6c still present in the tensioner pinion 4, is generated as a result of the abrupt stop of the single file of the mass bodies 6. This pulse can be utilized to sever the connection between the tensioner pinion 4 and the belt spool, insofar as a coupling or a detachable connection is provided between the tensioner pinion 4 and a belt spool (not illustrated), so that any potential subsequent force limitation by the still applied tightening force cannot be disrupted. The tensioner pinion 4 is clearly locked in any case as a result of the continuous single file of mass bodies 6, so that uncontrolled subsequent movements can be ruled out.

The tube 2 is provided at its end with a finger 10, with which it is inserted into a receptacle 9 in the housing 3. The tube 2 is fixed in the housing 3 as a result of the finger 10 held in the receptacle 9, so that the reactive forces produced during the tightening process are introduced into the housing 3.

Figure 3:
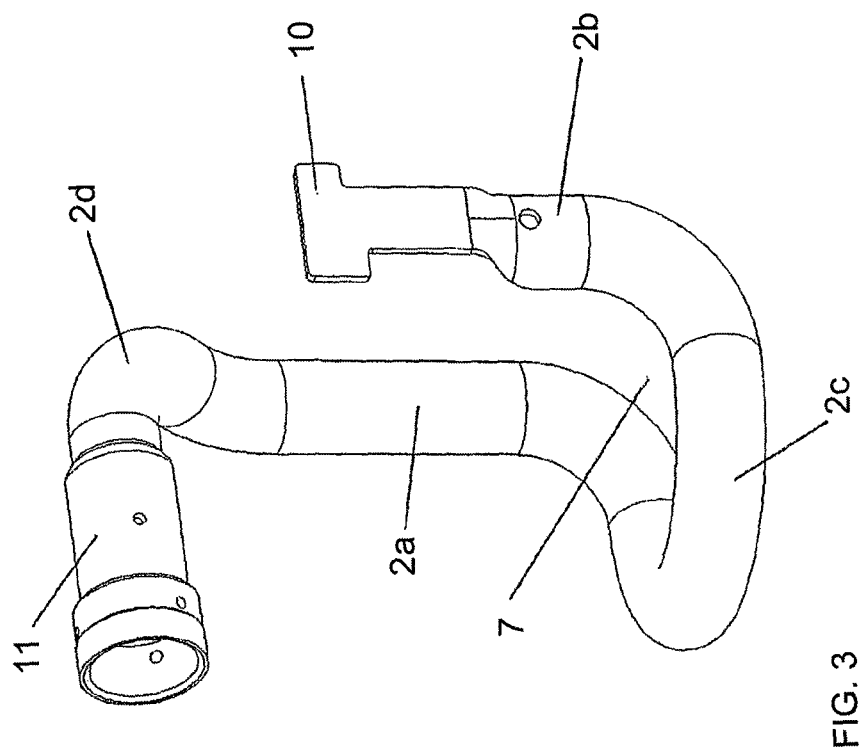
FIG. 3: shows a tube having an angular gas generator receptacle.

The tube 2 is illustrated as a single part in FIG. 3. Beginning at the gas generator receptacle 11, the tube 2 passes first through a first curvature 2d into the second section 2a. From there, the tube 2 passes into the U-shaped curved section 2c in the direction of the belt spool, to which then the second section 2b connects. A free space 7 is created between the sections 2a, 2b and 2c, which enables a guiding of the mass bodies 6 emerging from the tensioner pinion 4 up to nearly the edge of the housing 3, as can also evident in FIG. 2.

Figure 4:
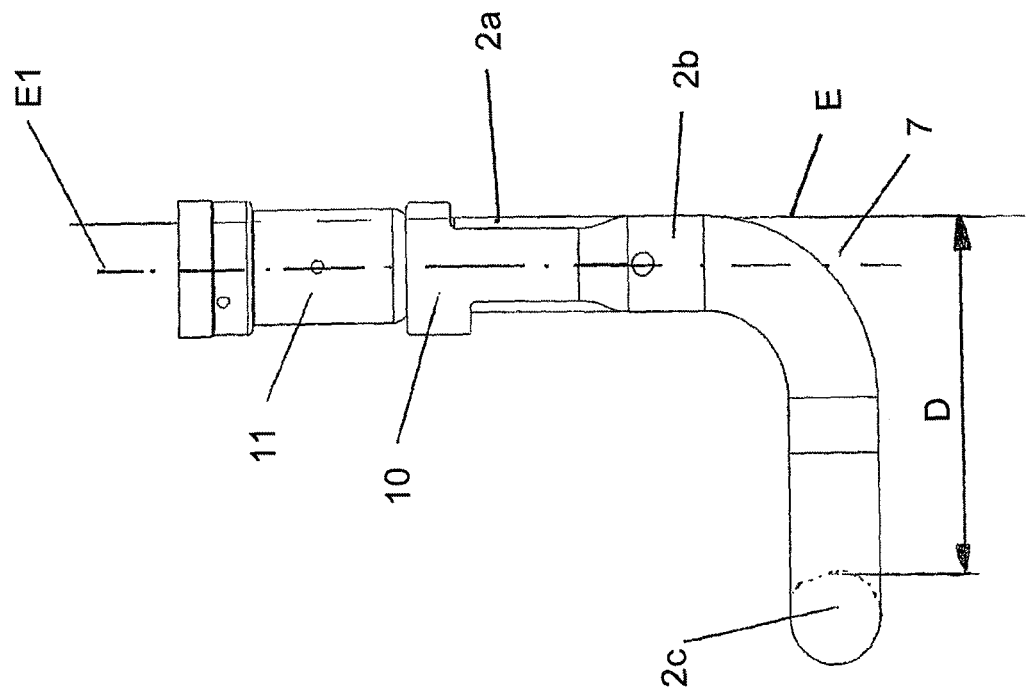
FIG. 4: shows a tube having straight adjoining gas generator receptacle.

FIG. 4 represents an alternative embodiment of the tube 2, which differs from the embodiment illustrated in FIG. 3 in that the gas generator receptacle 11 is formed by a straight-line extension of the first section 2a. The gas generator receptacle 11 is further aligned parallel to the second section 2b and is located within a plane E1 together with sections 2a and 2b. Since the gas generator receptacle 11 has a greater diameter than the tube 2, the plane E1 is formed herein by the central axes. The course of the tube 2 in FIG. 4 is thus greatly simplified. For example, the bend 2d of FIG. 3 can be omitted and the tube 2 can be pushed from the side with the housing 3 very easily onto the belt spool. Since the gas generator receptacle 11 does not protrude laterally in the direction toward the belt spool—as is the case in the embodiment of FIG. 4—the push-on movement cannot be disrupted by the gas generator receptacle 11. Contaminant particles that may be eventually present therein and/or in the second section 2b can moreover automatically drop out of the tube 2 during assembly of the gas generator as a result of the proposed alignment of the gas generator receptacle 11.

Based on the lateral illustration, the tube guide that is identical to the embodiment presented in FIG. 3—except for the alignment of the gas generator receptacle 11—is quite clearly seen. The first and the second sections 2a and 2b have a parallel alignment and form a plane E with their walls or a plane E1 with their center axes. The third section 2c has a course that curves out of the plane E. A free space 7, which has a maximum extension D from the wall of the tube 2 of section 2c up to the plane E, is created as a result of the curvature of section 2c. This maximum extension should preferably correspond least to the thickness of one mass body 6, so that the mass bodies 6 can be guided up to the edge of the housing 3 and can fill the free space 7 as well as possible.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A seat belt tensioner for a seat belt system of the type having a seat belt and a seat belt retractor with a spool rotatable about a longitudinal axis, the seat belt tensioner comprising:
    a tensioner drive pinion connected to the seat belt retractor to be rotatable with the spool about the longitudinal axis;
    a tube;
    a pyrotechnic gas generator located at an end of the tube; and
    several mass bodies drivable by pressure generated by the gas generator, the mass bodies being engageable with the tensioner drive pinion in a force transmitting manner to drive the seat belt retractor spool in a winding direction,
    the tube having a first section with a central axis extending past the tensioner drive pinion and perpendicular to the longitudinal axis, and the tube having a second section with a central axis tangentially approaching the tensioner drive pinion, the central axis of the first section and the central axis of the second section being arranged in one plane on opposite sides of the drive pinion and connected to each other via a third section of the tube, the third section having a curved central axis extending outward and transverse from the plane, and the first section, the second section and the third section defining a free space having dimensions suitable to accommodate at least one of the mass bodies emerging from the tensioner drive pinion.

2. The seat belt tensioner according to claim 1, further comprising that the mass bodies, after emerging from the tensioner drive pinion, are guided along a guide path, the guide path having a first portion extending parallel to the central axis of the first tube section and a second portion extending parallel to the central axis of the third tube section.

3. The seat belt tensioner according to claim 1, further comprising that the tube and the tensioner drive pinion bound a path of motion of the mass bodies, the path of motion having a spiral shape.

4. The seat belt tensioner according to claim 1 further comprising that a guide path running parallel to the third section is arranged in the free space for receiving the mass bodies.

5. The seat belt tensioner according to claim 1 further comprising that the third section is having the curved central axis lies on a plane that is generally perpendicular to the plane in which the first and second section are arranged.

6. The seat belt tensioner according to claim 1 further comprising that the central axis of the third section extends along a U-shaped curve out of the plane, and that the dimensions of the free space defined by the curve corresponds to at least a thickness of the mass bodies.

7. The seat belt tensioner according to claim 1 further comprising a gas generator receptacle on the tube, the gas generator receptacle, the first section and the second section being located in the same plane.

8. The seat belt tensioner according to claim 1 further comprising a gas generator receptacle on the tube, the gas generator receptacle having an axis parallel to the central axis of the second section.

9. The seat belt tensioner according to claim 1 further comprising a gas generator receptacle on the tube, the gas generator receptacle being formed by a linear elongation of the first section.

10. The seat belt tensioner according to claim 1 further comprising that the mass bodies, after emerging from the tensioner drive pinion, are guided in a single file headed by a first mass body, and that a stop is arranged on the seat belt tensioner, which is abutted by the first mass body while at least one mass body is still located in the tensioner drive pinion.

* * * * *